US 12,456,967 B2

(12) United States Patent
Lai et al.

(10) Patent No.: US 12,456,967 B2
(45) Date of Patent: Oct. 28, 2025

(54) MULTIMEDIA DEVICE AND OPERATING METHOD FOR SYSTEM-ON-CHIP

(71) Applicant: Realtek Semiconductor Corporation, Hsinchu (TW)

(72) Inventors: Chao-Min Lai, Hsinchu (TW); Chien-Liang Chen, Hsinchu (TW); Chia-Chi Yeh, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 63 days.

(21) Appl. No.: 18/613,107

(22) Filed: Mar. 22, 2024

(65) Prior Publication Data

US 2024/0322801 A1    Sep. 26, 2024

Related U.S. Application Data

(60) Provisional application No. 63/492,218, filed on Mar. 25, 2023.

(30) Foreign Application Priority Data

Oct. 5, 2023    (TW) ................................ 112138307

(51) Int. Cl.
| | |
|---|---|
| *H03K 3/017* | (2006.01) |
| *G06F 1/26* | (2006.01) |
| *G06F 1/28* | (2006.01) |
| *H03K 3/012* | (2006.01) |

(52) U.S. Cl.
CPC .............. *H03K 3/017* (2013.01); *G06F 1/26* (2013.01); *H03K 3/012* (2013.01); *G06F 1/28* (2013.01)

(58) Field of Classification Search
CPC .. G06F 1/26; G06F 1/28; H03K 3/012; H03K 3/017
See application file for complete search history.

(56) References Cited

U.S. PATENT DOCUMENTS

| | | | |
|---|---|---|---|
| 7,019,500 B2* | 3/2006 | Chen ..................... | H02M 3/156 323/282 |
| 2017/0019091 A1* | 1/2017 | Shon ..................... | H03K 5/003 |
| 2019/0348980 A1* | 11/2019 | Hayashi ........... | H03K 17/08128 |
| 2023/0216904 A1 | 7/2023 | Lai et al. | |

FOREIGN PATENT DOCUMENTS

| | | |
|---|---|---|
| EP | 4207778 A1 | 7/2023 |
| TW | 200746015 A | 12/2007 |
| TW | 202019163 A | 5/2020 |

* cited by examiner

*Primary Examiner* — Terrell S Johnson
(74) *Attorney, Agent, or Firm* — CKC & Partners Co., LLC

(57) ABSTRACT

A multimedia device comprises a power input interface, a computing circuit and a load circuit. The power input interface is configured to receive an operating voltage. The computing circuit is configured to receive the operating voltage from the power input interface, and configured to output a pulse-width modulation (PWM) signal. The load circuit is configured to receive a test current from the power input interface, receive the PWM signal, and determine a magnitude of the test current according to a duty ratio of the PWM signal. The computing circuit is configured to monitor the variation of the operating voltage while adjusting the duty ratio of the PWM signal step by step. The computing circuit is configured to determine an upper bound of a power consumption of the computing circuit according to the relationship between the operating voltage and the duty ratio of the PWM signal.

20 Claims, 4 Drawing Sheets

MULTIMEDIA DEVICE AND OPERATING METHOD FOR SYSTEM-ON-CHIP

CROSS-REFERENCE TO RELATED APPLICATIONS

This application claims priority to U.S. Provisional Application Ser. No. 63/492,218, filed Mar. 25, 2023, and Taiwan Application Serial Number 112138307, filed on Oct. 5, 2023, the disclosures of which are incorporated herein by reference in their entireties.

BACKGROUND

Technical Field

The present disclosure relates to a power monitoring technique. More particularly, the present disclosure relates to a multimedia device that is capable of monitoring an output current capability about a power source and also relates to an operating method of a system-on-chip.

Description of Related Art

In recent years, benefit from the flourishing of Internet streaming services, multimedia streaming devices such as over-the-top set-top boxes (OTT STB) and TV sticks have become a common part of home media systems. For ease of use, a multimedia streaming device is often designed to be driven by power provided by a monitor. However, since monitors from various manufactures have different designs, a multimedia streaming device may not receive sufficient input power, and thereby causing it to function incorrectly.

SUMMARY

The present disclosure provides a multimedia device, which includes a power input interface, a computing circuit and a load circuit. The power input interface is configured to receive an operating voltage. The computing circuit is coupled to the power input interface and is configured to receive the operating voltage from the power input interface, and configured to output a pulse-width modulation (PWM) signal. The load circuit is coupled to the power input interface and the computing circuit. The load circuit is configured to receive a test current from the power input interface, receive the PWM signal, and determine a magnitude of the test current according to a duty ratio of the PWM signal. The computing circuit is configured to monitor a variation of the operating voltage while adjusting the duty ratio of the PWM signal step by step. The computing circuit is configured to determine an upper bound of a power consumption of the computing circuit while outputting a multimedia data according to the relationship between the operating voltage and the duty ratio of the PWM signal.

The present disclosure provides an operating method for a system-on-chip, comprising: receiving a plurality of driving voltages generated according to an operating voltage; receiving a sensing signal representing a magnitude of the operating voltage; adjusting a duty ratio of a pulse-width modulation (PWM) signal step by step; monitoring a variation of the operating voltage while adjusting the duty ratio of the PWM signal step by step; and determining an upper bound of a power consumption of the system-on-chip while outputting a multimedia data according to the relationship between the operating voltage and the duty ratio of the PWM signal.

It is to be understood that both the foregoing general description and the following detailed description are by examples, and are intended to provide further explanation of the disclosure as claimed.

DETAILED DESCRIPTION

Figure 1:
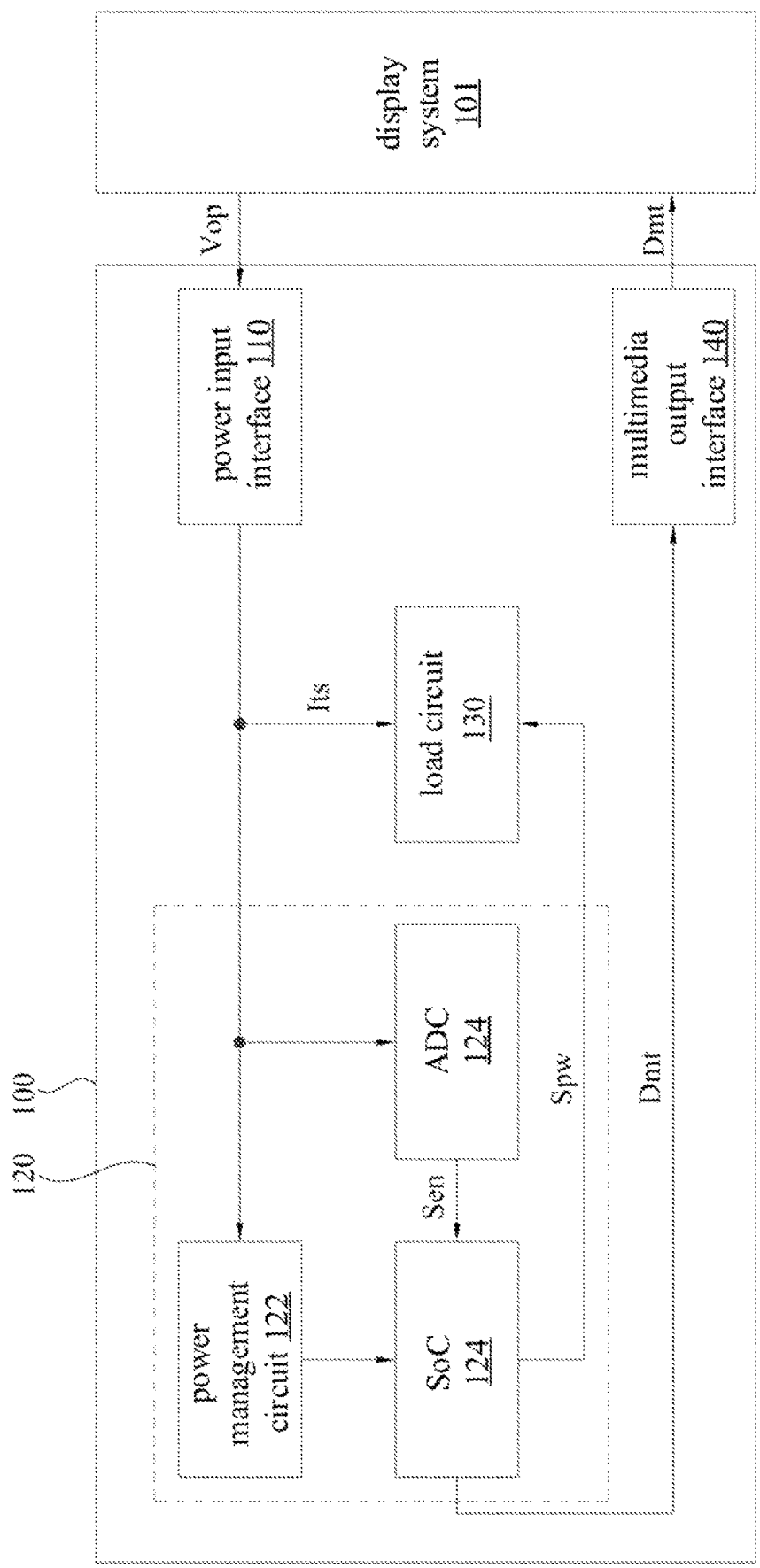
FIG. 1 is a simplified functional block diagram of a multimedia device according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified functional block diagram of a multimedia device 100 according to one embodiment of the present disclosure. The multimedia device 100 can be coupled to a display system 101, and configured to receive a power input needed for operation from the display system 101. The multimedia device 100 is further configured to receive a multimedia streaming from the Internet through a wired or wireless protocol, and configured to transmit a multimedia data Dmt to display system 101 after processing the multimedia streaming to transform it to the multimedia data Dmt with a format suitable for the display system 101. In some embodiments, the display system 101 can be implemented with a smart TV or other display devices with arithmetic computing capabilities. In other embodiments, the multimedia device 100 can be an over-the-top set-top box (OTT STB) or a TV stick.

The multimedia device 100 comprises a power input interface 110, a computing circuit 120, a load circuit 130 and a multimedia output interface 140. The power input interface 110 is configured to be coupled to the display system 101, and configured to receive an operating voltage Vop from the display system 101. In some embodiments, the power input interface 110 can be implemented with a universal serial bus (USB).

The computing circuit 120 is coupled to the power input interface 110, and configured to receive the operating voltage Vop from the power input interface 110, so as to conduct operations such as network communication, image processing, audio processing and a test on a output current capability of the display system 101. The computing circuit 120 is further configured to output a pulse-width modulation (PWM) signal Spw to control the load circuit 130.

The load circuit 130 is coupled to the power input interface 110, so as to be configured to receive a test current Its from the power input interface 110. That is, among the current that the power input interface 110 receives from the display system 101, a part will become the test current Its and the other part will be transmitted to the computing circuit 120. The load circuit 130 is further coupled to the computing circuit 120 to receive the PWM signal Spw from the computing circuit 120. The load circuit 130 is configured to determine a magnitude of the test current Its according to a duty ratio of the PWM signal Spw, and thereby test the output current capability of the display system 101. During the process of testing the output current capability of the display system 101, the computing circuit 120 adjusts the duty ratio of the PWM signal Spw step by step, and monitors the variation of the operating voltage Vop outputted by the power input interface 110 to get the relationship between the duty ratio of the PWM signal Spw and the operating voltage Vop. As a result, the computing circuit 120 can get the output current capability of the display system 101 to determine one or more operational settings of the computing circuit 120, and thereby determine an upper bound of a power consumption of the computing circuit 120 while outputting the multimedia data Dmt through the multimedia output interface 140. In some embodiments, the multimedia output interface 140 can be implemented with a high-definition multimedia interface (HDMI).

Figure 2:
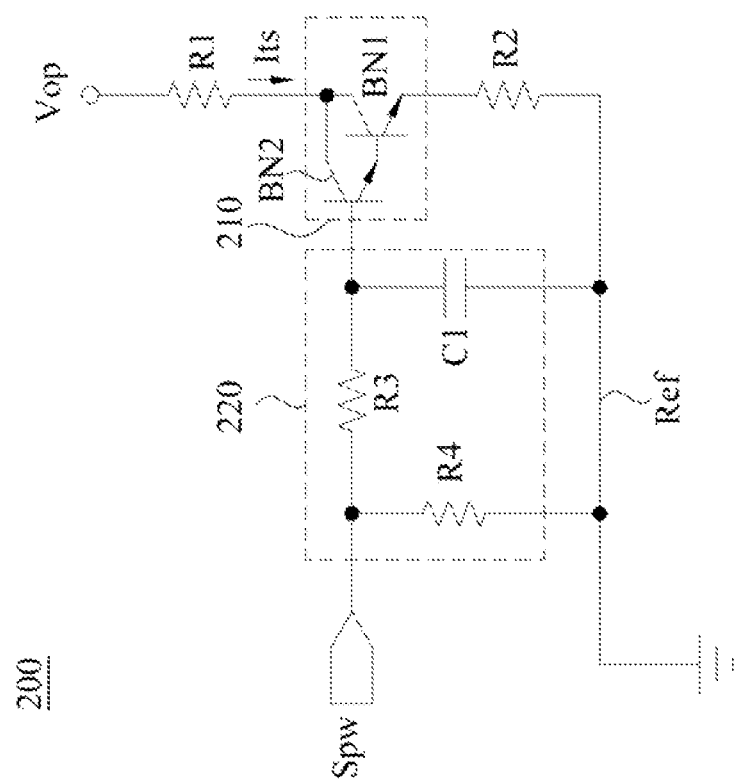
FIG. 2 is a schematic diagram of a load circuit according to one embodiment of the present disclosure.

Referring to FIG. 2, wherein FIG. 2 is a schematic diagram of a load circuit 200 according to one embodiment of the present disclosure. The load circuit 200 in FIG. 2 can be configured to implement the load circuit 130 in FIG. 1. The load circuit 200 comprises a resistor R1, a resistor R2, a Darlington circuit 210 and a filtering circuit 220. The Darlington circuit 210 comprises a first terminal, a second terminal and a control terminal.

The resistor R1 is coupled between the power input interface 110 and the first terminal of the Darlington circuit 210, wherein the resistor R1 is configured to receive the operating voltage Vop from the power input interface 110. The resistor R2 is coupled between the second terminal of the Darlington circuit 210 and a reference voltage source Ref.

The first terminal of the Darlington circuit 210 is configured to receive the test current Its from the power input interface 110 through the resistor R1. The filtering circuit 220 is coupled between the control terminal of the Darlington circuit 210 and the computing circuit 120. The filtering circuit 220 is configured to receive the PWM signal Spw from the computing circuit 120, and configured to transmit the filtered PWM signal Spw to the control terminal of the Darlington circuit 210.

More specifically, the Darlington circuit 210 comprises a transistor BN1 and a transistor BN2. Each of the transistors BN1 and BN2 comprises a first terminal (e.g., a collector terminal), a second terminal (e.g., an emitter terminal) and a control terminal (e.g., a base terminal). The first terminal of the transistor BN1 and the first terminal of the transistor BN2 are coupled to the resistor R1. The second terminal of the transistor BN1 is coupled to the resistor R2. The second terminal of the transistor BN2 is coupled to the control terminal of the transistor BN1. The control terminal of the transistor BN2 is coupled to the filtering circuit 220, and configured to receive the filtered PWM signal Spw. In some embodiments, transistors BN1 and BN2 can be implemented with N-type bipolar transistors.

The filtering circuit 220 comprises a resistor R3, a resistor R4 and a capacitor C1. The first terminal of the resistor R3 and the first terminal of the resistor R4 are coupled to the computing circuit 120 to receive the PWM signal Spw. The second terminal of the resistor R3 is coupled to the control terminal of the transistor BN2. The second terminal of the resistor R4 is coupled to the reference voltage source Ref. The capacitor C1 is coupled between the control terminal of the transistor BN2 and the reference voltage source Ref.

Under the situation that base currents of bipolar transistors are neglected, the test current Its in FIG. 2 can be represented by the following Formula 1. In Formula 1, "Vbn" represents a control terminal voltage of the transistor BN2; "Vben_sat" represents a saturation voltage of the Darlington circuit 210.

$$Its = (Vbn - \text{Vben\_sat})/R2 \qquad \text{(Formula 1)}$$

In the present embodiment, the control terminal voltage of the transistor BN2 is positively correlated to the duty ratio of the PWM signal. Therefore, according to Formula 1, the load circuit 200 is configured to control the magnitude of the test current Its to be positively correlated to the duty ratio of the PWM signal.

Figure 3:
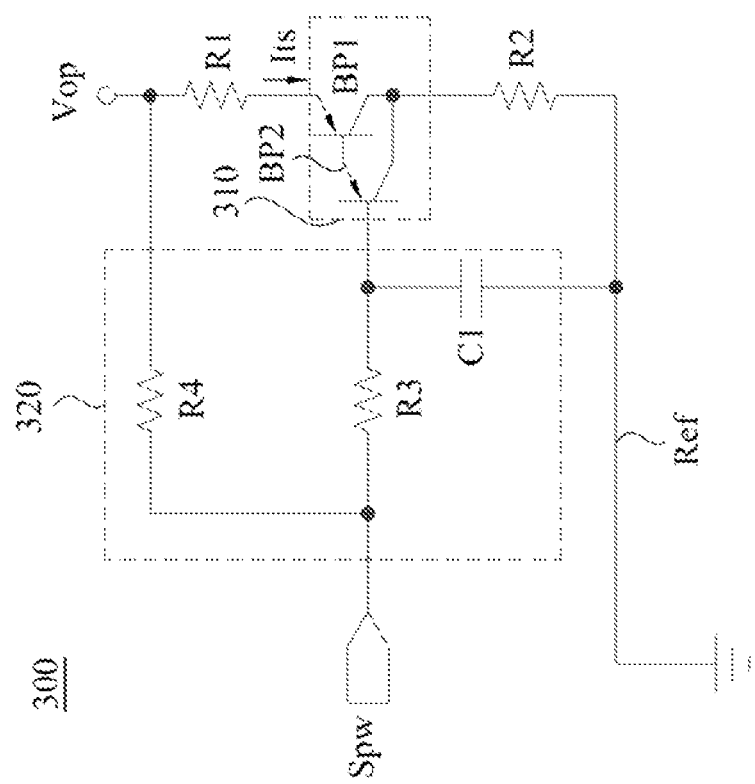
FIG. 3 is a schematic diagram of a load circuit according to one embodiment of the present disclosure.

FIG. 3 is a schematic diagram of a load circuit 300 according to one embodiment of the present disclosure. The load circuit 300 in FIG. 3 can be configured to implement the load circuit 130 in FIG. 1. The load circuit 300 comprises a resistor R1, a resistor R2, a Darlington circuit 310 and a filtering circuit 320. The only difference between the load circuit 300 in FIG. 3 and the load circuit 200 in FIG. 2 is the Darlington circuit 310. For simplicity, detailed descriptions for other similar parts are omitted thereto.

The Darlington circuit 310 comprises a transistor BP1 and a transistor BP2. Each of the transistors BP1 and BP2 comprises a first terminal (e.g., an emitter terminal), a second terminal (e.g., a collector terminal) and a control terminal (e.g., a base terminal). The first terminal of the transistor BP1 is coupled to the resistor R1. The second terminal of the transistor BP1 and the second terminal of the transistor BP2 are coupled to the resistor R2. The first terminal of the transistor BP2 is coupled to the control terminal of the transistor BP1. The control terminal of the transistor BP2 is coupled to the filtering circuit 320 and configured to receive the filtered PWM signal Spw. In some embodiments, transistors BP1 and BP2 can be implemented with P-type bipolar transistors.

In addition, the filtering circuit 320 comprises a resistor R3, a resistor R4 and a capacitor C1. The first terminal of the resistor R3 and the first terminal of the resistor R4 are coupled to the computing circuit 120 to receive PWM signal Spw. The second terminal of the resistor R3 is coupled to the control terminal of the transistor BP2. The second terminal of the resistor R4 is configured to receive the operating voltage Vop.

Under the situation that base currents of bipolar transistors are neglected, the test current Its in FIG. 3 can be represented by the following Formula 2. In Formula 2, "Vbp" represents a control terminal voltage of the transistor BP2; "Vbep_sat" represents a saturation voltage of the Darlington circuit 310.

$$Its = (Vop - \text{Vbep\_sat} - Vbp)/R1 \qquad \text{(Formula 2)}$$

In the present embodiment, control terminal voltage of the transistor BP2 is positively correlated to the duty ratio of the PWM signal. Therefore, according to Formula 2, the load circuit 300 is configured to control the magnitude of the test current Its to be negatively correlated to the duty ratio of the PWM signal.

Refer to FIG. 1 again, wherein the computing circuit 120 comprises a power management circuit 122, an analog-to-digital converter (ADC) 124 and a system-on-chip 126. The power management circuit 122 is coupled to the power input interface 110 and is configured to receive operating voltage Vop from the power input interface 110, and configured to generate a plurality of driving voltages (not depicted) according to the operating voltage Vop, so as to drive the system-on-chip 126. The ADC 124 is coupled to the power input interface 110, and is configured to receive the operating voltage Vop from the power input interface 110. The ADC 124 is also configured to generate a sensing signal Sen (e.g., a digital code) representing the magnitude of the operating voltage Vop.

The system-on-chip 126 is coupled to the power management circuit 122 to receive the plurality of driving voltages, and is coupled to the ADC 124 to receive the sensing signal Sen. The system-on-chip 126 is configured to output the PWM signal Spw and the multimedia data Dmt. The system-on-chip 126 monitors the operating voltage Vop to determine one or more operational settings of the system-on-chip 126 according to the relationship between the operating voltage Vop and the duty ratio of the PWM signal Spw, and thereby determine an upper bound of the power consumption of the system-on-chip 126 (or the computing circuit 120 as a whole) while outputting the multimedia data Dmt. In the following paragraph, the process of system-on-chip 126 for determining its one or more operational settings will be illustrated with reference to FIG. 4.

Figure 4:
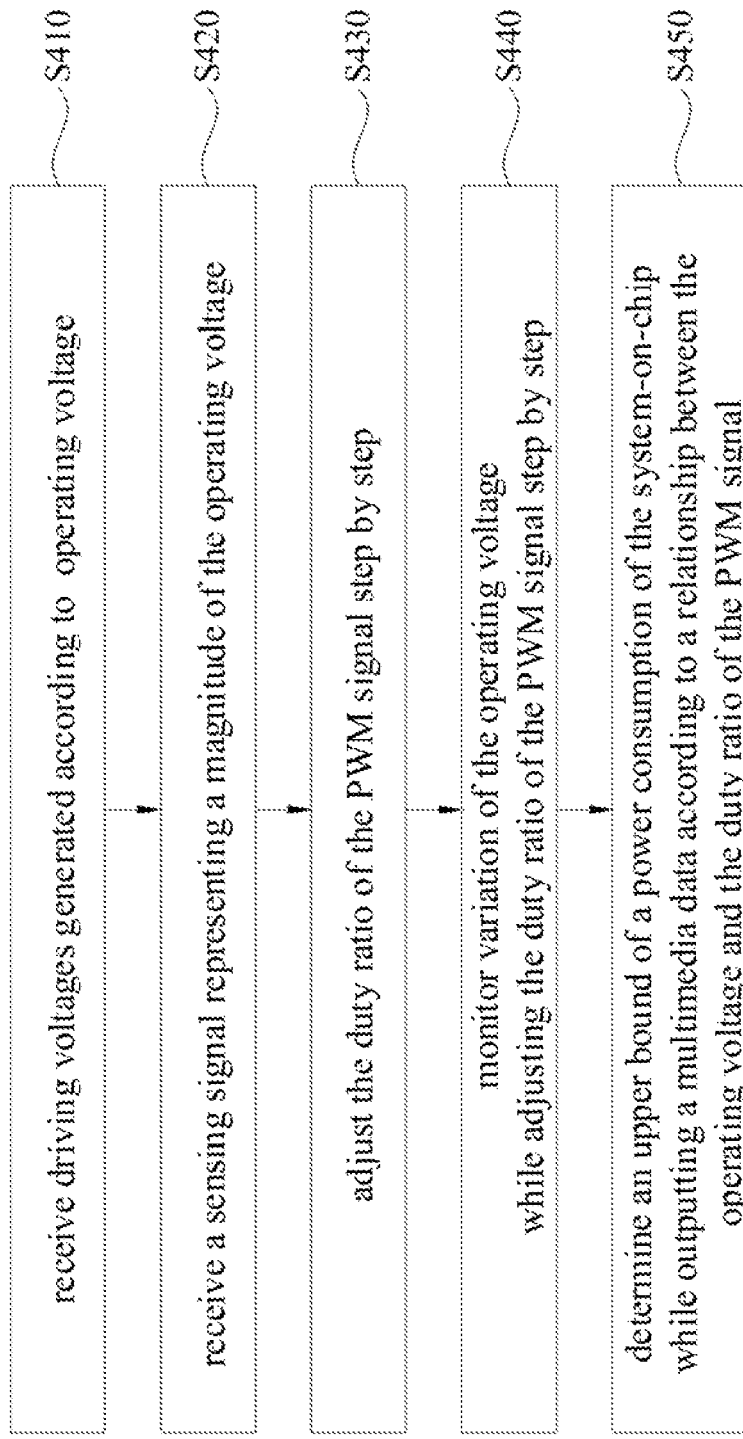
FIG. 4 is a flowchart of an operating method for a system-on-chip according to one embodiment of the present disclosure.

Refer to FIG. 1 and FIG. 4, wherein FIG. 4 is a flowchart of an operating method 400 for the system-on-chip 126 according to one embodiment of the present disclosure. In step S410, the system-on-chip 126 receives the plurality of driving voltages generated according to the operating voltage Vop. When the system-on-chip 126 receives a plurality of driving voltages, the system-on-chip 126 will be switched to a "power-on state" and conduct the rest of steps of the operating method 400.

In step S420, the system-on-chip 126 receives the sensing signal Sen from the ADC 124, and the sensing signal Sen represents the magnitude of the operating voltage.

In step S430, the system-on-chip 126 will adjust the duty ratio of the PWM signal Spw step by step. Then, in step S440, the system-on-chip 126 will monitor the variation of the operating voltage Vop while adjusting the duty ratio of the PWM signal Spw step by step. In some embodiments, step S430 and step S440 may be conducted at the same time. The system-on-chip 126 will adjust the duty ratio of the PWM signal Spw step by step until the system-on-chip 126 detects an occurrence about one of conditions: (1) the operating voltage Vop is lower than a voltage threshold; and (2) the duty ratio of the PWM signal Spw achieves a duty ratio threshold while the operating voltage Vop is still higher than or equal to the voltage threshold. In step S450, the system-on-chip 126 may get the relationship between the operating voltage Vop and the duty ratio of the PWM signal Spw according to the aforementioned detection. The system-on-chip 126 may further determine one or more operational settings of the system-on-chip 126 according to this relationship, and thereby determine the upper bound of the power consumption of the system-on-chip 126 (or the computing circuit 120 as a whole) while outputting the multimedia data Dmt.

More specifically, in the embodiments that the load circuit 130 in FIG. 1 is implemented with the load circuit 200 in FIG. 2, the system-on-chip 126 will increase the duty ratio of the PWM signal Spw step by step in step S430. For example, starting from a duty ratio of 50%, increase by 5% in each step, but the present disclosure is not limited thereto. In the present embodiment, the duty ratio threshold is 100% and the voltage threshold is 5V, but the present disclosure is not limited thereto.

In step S440, if the system-on-chip 126 has increased the duty ratio up to 100% while the operating voltage Vop remains higher than or equal to 5V, the system-on-chip 126 will determine that the display system 101 has a sufficient output current capability. In this situation, system-on-chip 126 may set the CPU and/or GPU of the system-on-chip 126 to have a higher clock rate while the system-on-chip 126 outputs the multimedia data Dmt in step S450. In addition, in step S450, the system-on-chip 126 may also set the multimedia data Dmt to have a higher resolution and/or frame rate.

In contrast, in step S440, if the system-on-chip 126 has not increase the duty ratio up to 100%, but the operating voltage Vop is already lower than 5V, the system-on-chip 126 will determine that the display system 101 does not have a sufficient output current capability. In this situation, in step S450, the system-on-chip 126 may lower the clock rate of the CPU, the clock rate of the GPU, or the higher resolution and/or the frame rate of the multimedia data Dmt according to the duty ratio of the PWM signal Spw that makes the operating voltage Vop lower than the voltage threshold adequately.

For example, if the operating voltage Vop still remains 5V while the duty ratio of the PWM signal Spw is increased to 100%, the system-on-chip 126 may set the multimedia data Dmt to have a resolution of 4K and a frame rate of and 60 fps. For example, if the operating voltage Vop drops below 5V while the duty ratio of the PWM signal Spw is increased to 80%, the system-on-chip 126 may set the multimedia data Dmt to have a resolution of 4K and a frame rate of 30 fps. For another example, if the operating voltage Vop is drops below 5V while the duty ratio of the PWM signal Spw is increased to 60%, the system-on-chip 126 may set the multimedia data Dmt to have a resolution of Full HD and a frame rate of 30 fps.

In short, in the embodiments that the load circuit 130 in FIG. 1 is implemented with the load circuit 200 in FIG. 2, if the system-on-chip 126 determines that the duty ratio of the PWM signal Spw has already been increased to the duty ratio threshold in step S440 while the operating voltage Vop remains higher than or equal to the voltage threshold, in step S450, the system-on-chip 126 will set the upper bound of the power consumption of itself while outputting the multimedia data Dmt as a first upper bound. In contrast, if the system-on-chip 126 determines that the duty ratio of the PWM signal Spw does not reach the duty ratio threshold, but the operating voltage Vop is already lower than the voltage threshold, in step S450, the system-on-chip 126 will set the upper bound of the power consumption of itself while outputting the multimedia data Dmt as a second upper bound. It is worth mentioning that the first upper bound is higher than the second upper bound, and the second upper bound will be positively correlated to the duty ratio of the PWM signal Spw that makes the operating voltage Vop lower than the voltage threshold.

In contrast, in the embodiments that the load circuit 130 in FIG. 1 is implemented with the load circuit 300 in FIG. 3, in step S430, the system-on-chip 126 will decrease the duty ratio of the PWM signal Spw step by step. For example, starting from a duty ratio of 50%, decrease by 5% in each step, but the present disclosure is not limited thereto. In the present embodiment, the duty ratio threshold is 0% and the voltage threshold is 5V, but the present disclosure is not limited thereto.

In step S440, if the system-on-chip 126 has already decreased the duty ratio to 0%, while the operating voltage Vop remains higher than or equal to 5V, the system-on-chip 126 will determine that the display system 101 has a sufficient output current capability. In contrast, in step S440, if the system-on-chip 126 has not decrease the duty ratio to 0% yet, but the operating voltage Vop is already lower than 5V, the system-on-chip 126 will determine that the display system 101 does not have a sufficient output current capability. The adjustments of system-on-chip 126 according to the aforementioned determination to the clock rate of the CPU, the clock rate of the GPU and the resolution and/or the frame rate of the multimedia data Dmt are similar to the previous embodiment. For simplicity, detailed descriptions thereof are omitted here.

In short, in the embodiments that the load circuit 130 in FIG. 1 is implemented with the load circuit 300 in FIG. 3, if the system-on-chip 126 determines that the duty ratio of the PWM signal Spw has already been decreased to the duty ratio threshold in step S440 while the operating voltage Vop remains higher than or equal to voltage threshold, in step S450, the system-on-chip 126 will set the upper bound of the power consumption of itself while outputting the multimedia data Dmt as the first upper limit. In contrast, in step S440, if the system-on-chip 126 determines that the duty ratio of the PWM signal Spw has not been decreased to the duty ratio threshold yet, but the operating voltage Vop is already lower than the voltage threshold, in step S450, the system-on-chip 126 will set the upper bound of the power consumption of itself while outputting the multimedia data Dmt as the second upper bound. It is worth mentioning that the first upper bound is higher than the second upper bound and the second upper bound will be negatively correlated to the duty ratio of the PWM signal Spw that makes the operating voltage Vop lower than the voltage threshold.

To sum up, the system-on-chip 126 will get the output current capability of the display system 101 according to the relationship between the operating voltage Vop and the duty ratio of the PWM signal Spw, and thereby determine one or more operational settings of the system-on-chip 126 (e.g., the clock rate of the CPU, the clock rate of the GPU, and the resolution and/or the frame rate of multimedia data). Therefore, the system-on-chip 126 may adaptively determine the upper bound of the power consumption of itself (or the computing circuit 120) while outputting the multimedia data Dmt, so as to avoid functioning incorrectly.

Certain terms are used in the specification and the claims to refer to specific components. However, those of ordinary skill in the art would understand that the same components may be referred to by different terms. The specification and claims do not use the differences in terms as a way to distinguish components, but the differences in functions of the components are used as a basis for distinguishing. Furthermore, it should be understood that the term "comprising" used in the specification and claims is open-ended, that is, including but not limited to. In addition, "coupling" herein includes any direct and indirect connection means. Therefore, if it is described that the first component is coupled to the second component, it means that the first component can be directly connected to the second component through electrical connection or signal connections including wireless transmission, optical transmission, and the like, or the first component is indirectly electrically or signally connected to the second component through other component(s) or connection means.

It will be understood that, in the description herein and throughout the claims that follow, the phrase "and/or" includes any and all combinations of one or more of the associated listed items. Unless the context clearly dictates otherwise, the singular terms used herein include plural referents.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A multimedia device, comprising:
a power input interface, configured to receive an operating voltage;
a computing circuit, coupled to the power input interface, configured to receive the operating voltage from the power input interface and output a pulse-width modulation (PWM) signal; and
a load circuit, coupled to the power input interface and the computing circuit, configured to receive a test current from the power input interface, receive the PWM signal, wherein the load circuit is configured to determine a magnitude of the test current according to a duty ratio of the PWM signal,
wherein the computing circuit is configured to monitor a variation of the operating voltage while adjusting the duty ratio of the PWM signal step by step,
wherein the computing circuit is configured to determine an upper bound of a power consumption of the computing circuit while outputting a multimedia data according to a relationship between the operating voltage and the duty ratio of the PWM signal.

2. The multimedia device of claim 1, wherein the load circuit comprises:
a Darlington circuit, comprising a first terminal, a second terminal and a control terminal, wherein the first terminal of the Darlington circuit is configured to receive the test current;
a filtering circuit, coupled to the control terminal of the Darlington circuit, configured to receive the PWM signal and transmit the filtered the PWM signal to the control terminal of the Darlington circuit;
a first resistor, coupled between the power input interface and the first terminal of the Darlington circuit; and
a second resistor, coupled between the second terminal of the Darlington circuit and a reference voltage source.

3. The multimedia device of claim 1, wherein the load circuit is configured to control a magnitude of the test current to be positively correlated to the duty ratio of the PWM signal.

4. The multimedia device of claim 1, wherein the load circuit is configured to control a magnitude of the test current to be negatively correlated to the duty ratio of the PWM signal.

5. The multimedia device of claim 1, wherein the computing circuit is configured to increase the duty ratio of the PWM signal step by step.

6. The multimedia device of claim 1, wherein the computing circuit is configured to decrease the duty ratio of the PWM signal step by step.

7. The multimedia device of claim 1, wherein the computing circuit is configured to adjust the duty ratio of the PWM signal step by step, until the computing circuit detects an occurrence about one of conditions comprising:
(1) the operating voltage being lower than a voltage threshold; and
(2) the duty ratio of the PWM signal reaching a duty ratio threshold and the operating voltage being higher than or equal to the voltage threshold.

8. The multimedia device of claim 7, wherein in response to the computing circuit determines that the duty ratio of the PWM signal reaches the duty ratio threshold and the operating voltage is higher than or equal to the voltage threshold, the computing circuit sets a first upper bound according to the upper bound of the power consumption of the computing circuit while outputting the multimedia data,
wherein in response to the computing circuit determines that the operating voltage is lower than the voltage threshold, the computing circuit sets a second upper bound according to the upper bound of the power consumption of the computing circuit while outputting the multimedia data,
wherein the first upper bound is higher than the second upper bound.

9. The multimedia device of claim 8, wherein the second upper bound is positively correlated to the duty ratio of the PWM signal, wherein the duty ratio of the PWM signal causes the operating voltage to be lower than the voltage threshold.

10. The multimedia device of claim 8, wherein the second upper bound is negatively correlated to the duty ratio of the PWM signal, wherein the duty ratio of the PWM signal causes the operating voltage to be lower than the voltage threshold.

11. The multimedia device of claim 7, wherein the computing circuit comprises:
a power management circuit, configured to receive the operating voltage, so as to generate a plurality of driving voltages according to the operating voltage;
an analog-to-digital converter (ADC), configured to receive the operating voltage, so as to be configured to generate a sensing signal representing the magnitude of the operating voltage; and
a system-on-chip, coupled to the power management circuit and the analog-to-digital converter, so as to receive the plurality of driving voltages and the sensing signal, configured to output the PWM signal and the multimedia data, wherein the system-on-chip is configured to determine the occurrence about the one of conditions, so as to determine the upper limit of the power consumption of the system-on-chip while outputting the multimedia data, and thereby determine the an upper limit of a power consumption of the computing circuit while outputting the multimedia data.

12. The multimedia device of claim 1, wherein the computing circuit is configured to determine a clock rate of a CPU or a GPU of the computing circuit according to a relationship between the operating voltage and the duty ratio of the PWM signal, and thereby determine an upper bound of a power consumption of the computing circuit while outputting the multimedia data.

13. An operating method for a system-on-chip, comprising:
receiving a plurality of driving voltages generated according to an operating voltage;
receiving a sensing signal representing a magnitude of the operating voltage;
adjusting a duty ratio of a pulse-width modulation (PWM) signal step by step;
monitoring a variation of the operating voltage while adjusting the duty ratio of the PWM signal step by step; and
determining an upper bound of a power consumption of the system-on-chip while outputting a multimedia data according to a relationship between the operating voltage and the duty ratio of the PWM signal.

14. The operating method of claim 13, wherein adjusting the duty ratio of the pulse-width modulation (PWM) signal outputted by the system-on-chip step by step comprises:
increasing the duty ratio of the PWM signal step by step.

15. The operating method of claim 13, wherein adjusting the duty ratio of the pulse-width modulation (PWM) signal outputted by the system-on-chip step by step comprises:
decreasing the duty ratio of the PWM signal step by step.

16. The operating method of claim 13, wherein adjusting the duty ratio of the pulse-width modulation (PWM) signal outputted by the system-on-chip step by step comprises:
adjusting the duty ratio of the PWM signal step by step, until the system-on-chip detects an occurrence about one of conditions comprising:
(1) the operating voltage being lower than a voltage threshold; and
(2) the duty ratio of the PWM signal reaching a duty ratio threshold and the operating voltage being higher than or equal to the voltage threshold.

17. The operating method of claim 16, wherein determining the upper limit of the power consumption of the system-on-chip while outputting the multimedia data according to the relationship between the operating voltage and the duty ratio of the PWM signal further comprises:
in response to the system-on-chip determines that the duty ratio of the PWM signal reaches the duty ratio threshold and the operating voltage is higher than or equal to the voltage threshold, setting a first upper bound according to the upper bound of the power consumption of a computing circuit while outputting the multimedia data; and
in response to the system-on-chip determines that the operating voltage is lower than the voltage threshold, setting a second upper bound according to the upper bound of the power consumption of the computing circuit while outputting the multimedia data,
wherein the first upper bound is higher than the second upper bound.

18. The operating method of claim 17, wherein the second upper bound is positively correlated to the duty ratio of the PWM signal, wherein the duty ratio causes the operating voltage to be lower than the voltage threshold.

19. The operating method of claim 17, wherein the second upper bound is negatively correlated to the duty ratio of the PWM signal that causes the operating voltage to be lower than the voltage threshold.

20. The operating method of claim 13, wherein determining an upper bound of the power consumption of the system-on-chip while outputting the multimedia data according to the relationship between the operating voltage and the duty ratio of the PWM signal comprises:
determining a clock rate of a CPU or a GPU of a computing circuit according to the relationship between the operating voltage and the duty ratio of the PWM signal, and thereby determining an upper bound of a power consumption of the system-on-chip while outputting the multimedia data.

* * * * *